Figure 1:
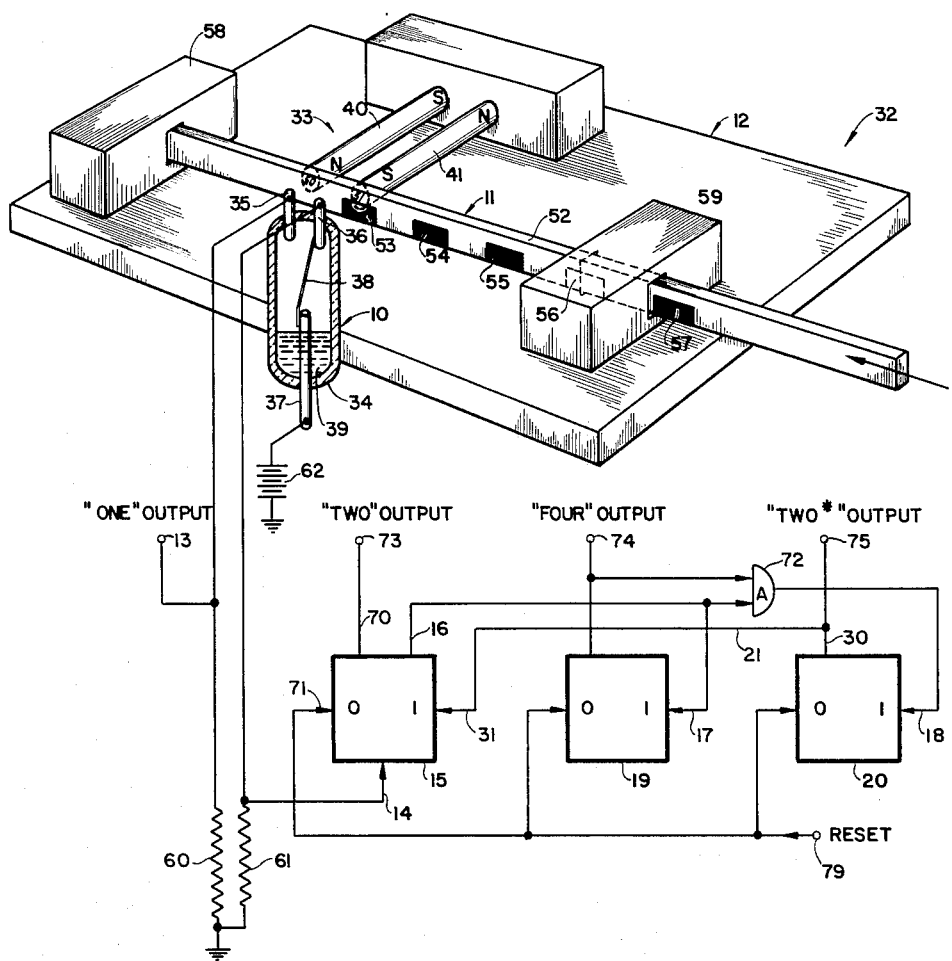

Jan. 4, 1966   D. E. LEHMER   3,228,021

POSITION INDICATING SYSTEM

Filed May 5, 1961   3 Sheets-Sheet 1

INVENTOR.
DONALD E. LEHMER
BY Louis J. Knobbe
ATTORNEY

INVENTOR.
DONALD E. LEHMER

Jan. 4, 1966     D. E. LEHMER     3,228,021
POSITION INDICATING SYSTEM

Filed May 5, 1961     3 Sheets-Sheet 3

INVENTOR.
DONALD E. LEHMER
BY Louis J. Knobbe
ATTORNEY

United States Patent Office 3,228,021
Patented Jan. 4, 1966

3,228,021
POSITION INDICATING SYSTEM
Donald E. Lehmer, Berkeley, Calif., assignor to Beckman Instruments, Inc., a corporation of California
Filed May 5, 1961, Ser. No. 107,990
9 Claims. (Cl. 340—347)

The present invention relates generally to a position indicating system and, more particularly, to a system for digitally indicating a plurality of unique positions of a movable member relative to a fixed member.

In many fields of contemporary endeavor, digital signals are employed for transmitting information. Representative examples include digital readout devices, digital servos, and digital control systems. A problem frequently encountered is that of generating a digital signal indicative of the position of one member relative to another member. Digital position indicating systems known in the art do not provide a completely successful solution for this problem. Certain of these systems, for example, utilize a sliding contact switch mounted between the movable and stationary members so that a particular electrical connection is made for each unique position of the movable member relative to the fixed member. Although the sliding contact switches have the advantage of being adapted for controlling relatively large currents, this advantage is often outweighed by such disadvantages as being adversely affected by dust, if not sealed; mechanical wear; contact burning; and the necessity of providing a relatively large force between the movable and stationary members. Certain other digital position indicating systems employing photoelectric, capacitive or inductance type indicating elements are quite complex and expensive to manufacture.

Another objection to the prior art digital position indicating systems is that they are normally limited to generating a single digital code. A number of different codes are presently utilized in various systems employing digitally encoded information. In order to make the prior art systems compatible with more than one digital code, complex and expensive digital code conversion systems have been required between the digital position indicating system and the remainder of the apparatus with which it is connected.

Accordingly, it is an object of the present invention to provide a digital position indicating system which does not require any physical connection between the movable and stationary members.

Another object of this invention is to provide a digital position indicating system which utilizes a minimum number of electrical components and which may be constructed at a relatively low cost.

Another object of the present invention is to provide a digital position indicating system of simple construction capable of generating more than one digital code.

Other and further objects, features and advantages of the invention will become apparent as the description proceeds.

Briefly, in accordance with a preferred form of the present invention, there is provided, in combination, a bistable switch under the control of an external magnetic field which varies according to movement of the movable member relative to the fixed member. The two stable states provided by the bistable switch means are insufficient for indicating a plurality of unique positions of the movable member relative to the fixed member. Accordingly, the position indicating system also includes additional bistable or flip-flop stages connected in a cascaded series, the first bistable stage being connected to an output of the bistable switch means. In order to conserve the number of components utilized in a position indicating system, the number of bistable stages utilized will usually be insufficient for indicating the total number of required position indications. Systems constructed according to the present invention provide a sufficient number of unique digitally encoded output signals for indicating the total number of required position indications by deriving digitally encoded output signals from both the bistable switch and the additional bistable stages. Modifications of the present invention incorporate different feedback paths interconnecting the additional bistable stages so as to provide output signals encoded in first and second digital codes. The particular code desired is selected by merely applying the appropriate control signal in one embodiment of the invention or by merely operating a switch in other embodiments of the invention.

Digital position indicating systems constructed in the manner described do not require any physical connection between the movable and fixed members. Moreover, the systems constructed in accordance with the present invention require a minimum number of electrical components since digitally encoded output signals are derived both from the bistable switch and the additional bistable stages.

Figure 2:
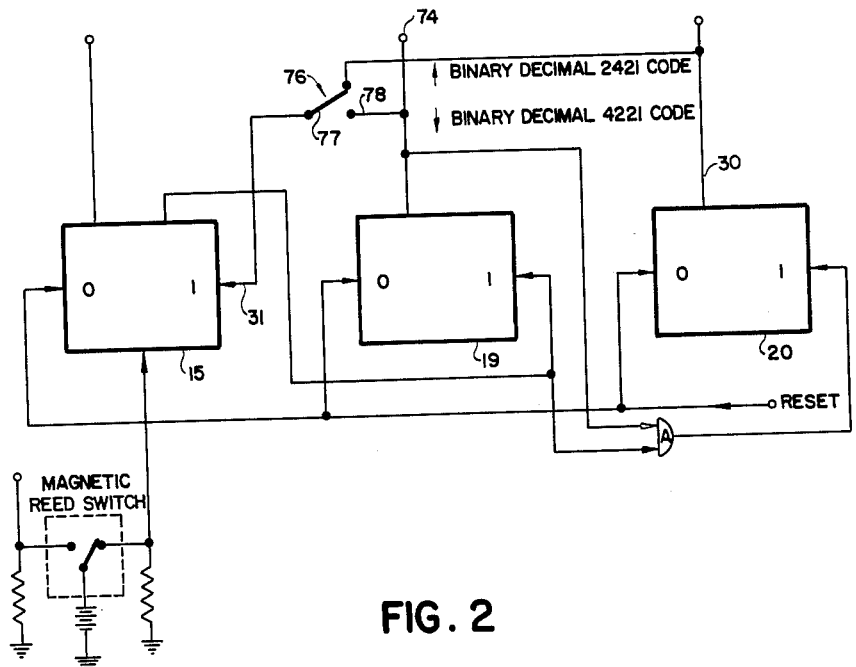
Figure 3:
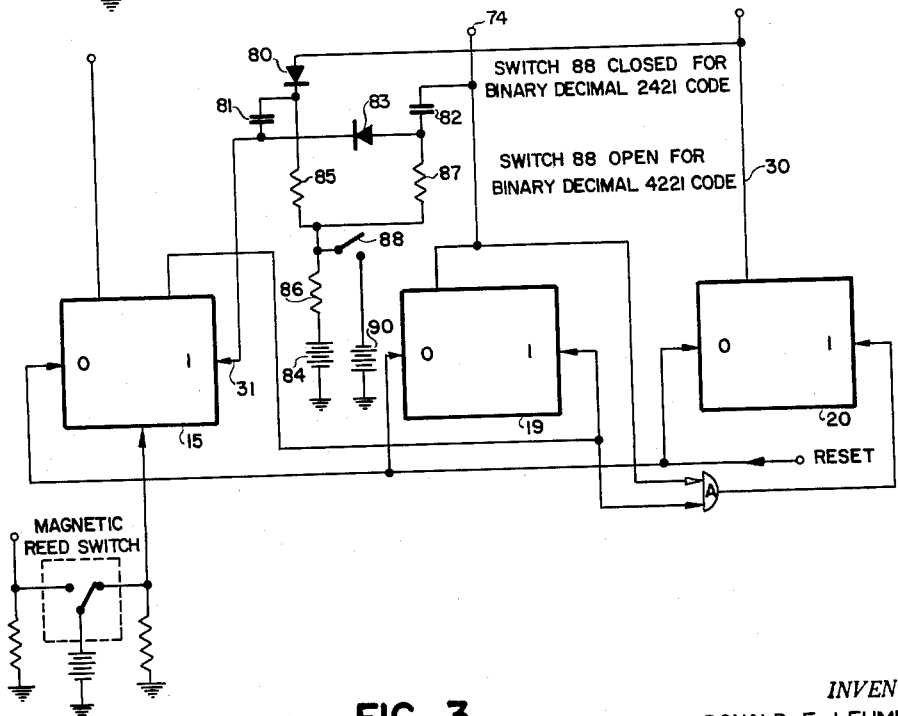
Figure 4:
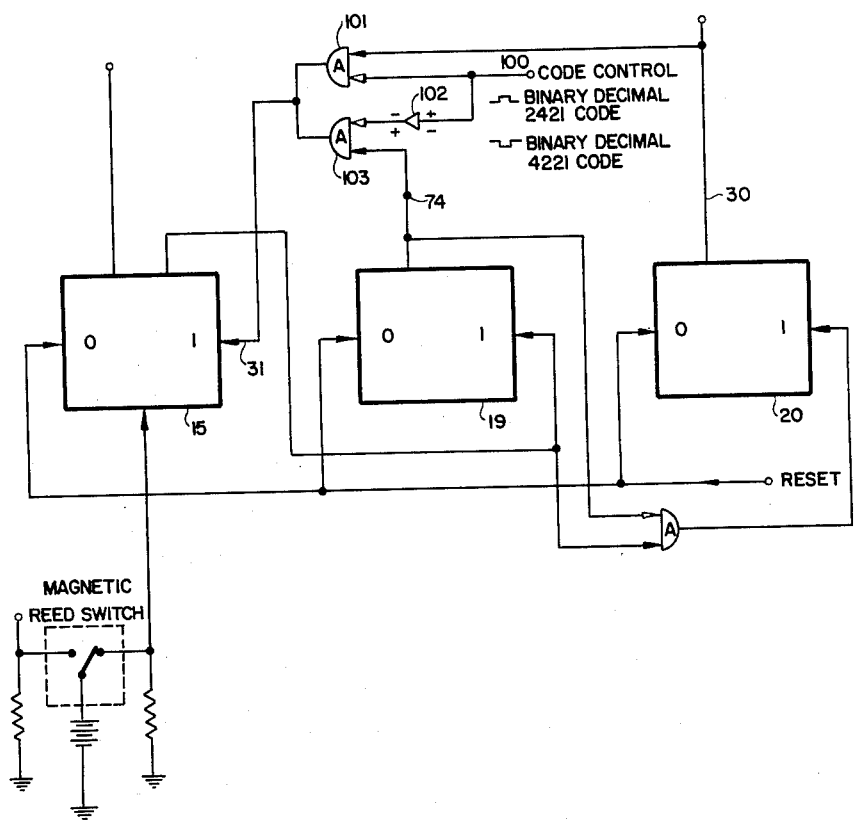

A more thorough understanding of the invention may be obtained by the following detailed description taken in connection with the accompanying drawings in which:

FIG. 1 is a partially perspective and partially schematic view of an embodiment of a digital position indicating system constructed in accordance with the present invention; and FIGS. 2, 3 and 4 are schematic diagrams of alternate circuits employed for achieving output signals encoded in first and second digital codes.

Referring now to FIG. 1, there is shown a digital position indicating system constructed in accordance with the present invention comprising bistable switch 10 actuated in response to changes in an external magnetic field caused by movement of a movable member 11 relative to a fixed member 12. One output of switch 10 is connected to output terminal 13 whereas the other output is connected to the trigger input 14 of a first bistable or flip-flop stage 15. Additional series cascaded flip-flop stages 19 and 20 are connected to an output of flip-flop stage 15. A feedback path 21 interconnects the output 30 of the third flip-flop stage 20 with the set input 31 of the first flip-flop stage 15 so as to provide an output signal encoded in the binary decimal 2-4-2-1 code, a unique output signal being generated for each of the ten unique positions of the movable member 11 relative to the fixed member 12. By way of example, the embodiment of the invention illustrated in FIG. 1 provides a unique output signal for each of ten unique positions of the movable member relative to the fixed member. These ten unique output signals are provided with a minimum number of components, namely the bistable switch 10 and the three bistable flip-flop stages 15, 19 and 20.

The system shown in FIG. 1 will now be described in further detail. Bistable switch 10 is preferably incorporated in a digital position transducer 32 comprising switch 10, a magnetic field generating source 33 attached to the fixed member 12, and a nonhomogeneous movable member 11 movable in a linear direction relative to the fixed member 12. The digital position transducer 32 per se is not a part of the present invention but rather is described and claimed by M. A. Hall in the copending application Serial No. 107,991, now Patent No. 3,114,020, entitled "High Resolution Digital Position Transducer," filed on even date herewith and assigned to Beckman Instruments, Inc., assignee of the present invention. As described therein, switch 10 preferably comprises a capsule 34 in which a first magnetic electrode 35 and a second magnetic electrode 36 are sealed in one end thereof. A third electrode 37 sealed in the other end of the capsule has attached thereto within the capsule a magnetic reed 38 which is positioned between the first and second magnetic electrodes so that it may make electrical contact with either one or the other of the electrodes dependent upon whichever of the electrodes has applied thereto the stronger magnetic field. Swith 10 is, therefore, a single-pole, double-throw switch. A small amount of mercury 39 placed in the capsule 34 rises to the tip of reed 38 by capillary action and wets the electrodes 35 and 36 and the reed 38 thereby providing an excellent metallic contact between the reed and the electrode closest to the reed. This mercury presents a clean contact surface each time the switch is closed, thereby giving very low contact resistance. Also, this mercury provides a make-before-break switch operation which, as described hereinafter, may be preferred in systems constructed according to the present invention. An inert gas at a high pressure is preferably introduced into the capsule so as to increase the voltage limits of the switch and quench any arcs that may form during the switching operation.

Magnetic field source 33 is designed to establish a symmetrical magnetic field proximate the magnetic switch electrodes 35 and 36. This source conveniently takes the form of a pair of oppositely poled, equal strength magnets 40 and 41 having ends 50 and 51 juxtaposed respective magnetic switch electrodes 35 and 36. As a result, the magnetic flux densities proximate the electrodes 35 and 36 are substantially equal unless an element of nonhomogeneous permeability is interposed between the electrodes 35, 36 and magnets 40, 41.

Such an element is movable member 11 which comprises a rod 52 constructed of low permeability material in which spaced teeth 53, 54, 55, 56 and 57 of high permeability material are retained. Rod 52 is slidably mounted in upstanding bearing blocks 58 and 59 which are rigidly attached to the fixed member 12. The width of teeth 53–57 are usually of the same order of magnitude as the width of the magnet pole faces 50, 51. The spacing of these teeth is greater than the spacing of the magnet pole pieces 50 and 51 so that only one tooth is opposite an electrode in any given position of the rod.

As described in the copending application entiled "High Resolution Digital Position Transducer," supra, a shaft position transducer may easily be constructed by substituting a nonhomogeneous disc rotatably mounted with respect to the fixed member 12 for the nonhomogeneous rod 52.

Digital transducer 32 operates by alternately providing a low reluctance path between the magnetic field source 33 and magnetic electrodes 35 and 36. Thus, in the illustration of FIG. 1, the reed 38 is attracted to the second electrode 36 since this electrode is adjacent the magnetic tooth 53. As rod 52 is translated in the direction shown (from right to left), tooth 53 is caused to leave its position adjacent the electrode 36 and assume a position adjacent the first electrode 35 thereby weakening the magnetic field strength applied to an electrode 36 while strengthening the magnetic field strength applied to electrode 35. As a result, reed 38 is abruptly attracted away from electrode 36 to electrode 35. Stated in another way, switch 10 is actuated from a first stable position of electrical contact between electrodes 36 and 37 to a second stable position of electrical contact between electrodes 35 and 37.

The output signals derived from switch 10 are utilized directly as output signals of the digital position indicating system and also as triggering pulses for the associated flip-flop stages. Thus, magnetic electrode 35 is connected to output terminal 13 and to the base reference potential or ground via resistor 60, whereas magnetic electrode 36 is connected to the trigger input 14 of flip-flop stage 15 and to the base reference potential or ground via resistor 61. Output signals from the bistable switch 10 are provided by a positive voltage source, represented by a battery 62 connected between ground and switch electrode 37. In the system shown and hereinafter described, a ground potential at terminal 13 indicates a binary 0 whereas a positive potential at this terminal indicates a binary 1.

Each of the bistable flip-flop circuits 15, 19 and 20 may be constructed in any one of the numerous ways presently known in the art. A representative circuit, for example, incorporates a pair of transistors so cross-coupled that the transistors are retained in mutually exclusive states of conduction and nonconduction. The flip-flop stage indicated by box 15 includes first and second output terminals 70 and 16, a trigger input 14, a set input 31 and a reset input 71. A positive potential step applied to the trigger input 14 will cause the flip-flop to trigger to its opposite stable state. The two states of the transistor are reflected in different potential levels at the output terminals 70 and 16. For example, a negative signal output at the left-hand output 70 and a ground potential at the right-hand output 16 may indicate a binary 0 output whereas a ground potential on the left-hand output and a negative potential on the right-hand output may indicate a binary 1 output. A reset pulse of appropriate polarity applied to the reset input 71 causes the flip-flop stage to return to its binary 0 state. A positive potential step applied to the set terminal 31 causes the flip-flop stage to trigger to the binary 1 state if it was previously in the binary 0 state. A positive potential step applied to this terminal when the flip-flop is already in the binary 1 state has no effect upon the state of the flip-flop circuit. The remaining component in the circuit of FIG. 1 is AND gate 72 which is designed to pass a pulse only at such time as the second flip-flop stage is in the binary 1 state and the first flip-flop stage changes from a binary 1 state to a binary 0 state.

The operation of the digital position indicating system of FIG. 1 will now be described: The circuit shown is arranged to provide output signals encoded in the binary decimal 2–4–2–1 code; accordingly, the output signals generated by the bistable switch and each of the flip-flop stages for each of the unique positions of the movable member 11 relative to the fixed member 12 conform to Table 1.

TABLE 1

| Position No. | Bistable Switch 10 ONE Output | Flip-flop 15 TWO Output | Flip-flop 19 FOUR Output | Flip-flop 20 TWO* Output |
|---|---|---|---|---|
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 1 | 1 | 1 |
| 9 | 1 | 1 | 1 | 1 |

Initially, the movable member 11 is in Position No. 0 (shown in FIG. 1) in which the initial magnetic tooth 53 is located between the second magnetic electrode 36 and pole 41 of the magnetic field source 33. At such time, the reed 38 is attracted to the magnetic electrode 36 so that the ONE output terminal 13 is connected to ground potential via resistor 60. Each of the flip-flop circuits are in their reset of binary 0 state so that a negative potential is applied to the "TWO" output terminal 73, the "FOUR" output terminal 74 and the TWO* output terminal 75. Movement of the movable rod 52 with respect to the fixed member 12 a sufficient distance will cause the movable member to assume its second unique position (Position No. 1) in which magnetic tooth 53 assumes a position between the first magnetic electrode 35 and pole piece 40 of the magnetic field source 33. As a result, reed 38 is attracted to the first magnetic electrode so as to apply a positive potential or binary 1 to the ONE output terminal 13. This change does not affect the first flip-flop stage 15 since a negative potential step is applied to the trigger input thereof. Further translation of the movable member relative to the fixed member brings the movable member to its Position No. 2 in which magnetic tooth 54 is located between the second magnetic electrode 36 and pole piece 41 of the magnetic field source. The bistable switch is then reverted to its original or binary 0 state. At this time, however, a positive potential step is applied to the trigger input terminal 14 of the first flip-flop stage 15 so as to cause this stage to change to its binary 1 state and apply ground potential to the TWO output terminal 73 and negative potential to its right-hand output 16. This potential change on the right-hand output 16 does not affect the second or third flip-flop stages since they respond only to a positive potential step. It may be noted that if switch 10 is not a make-before-break actuation switch there will be a brief period in which erroneous system outputs are briefly indicated as rod 52 is moved through Positions 0 to 9. Thus, if switch 10 is a break-before-make switch, after reed 38 leaves the first magnetic electrode 35, but before it reaches the second magnetic electrode 36, the output terminal 13 is grounded (binary 0) and each of the flip-flop stages are also still in their binary 0 states, an erroneous indication of Position No. 0 is given instead of Position No. 1. In many applications, such erroneous outputs may be tolerated since they occur only for the brief make period of the switch. However, as described hereinabove, switch 10 may be easily constructed as a make-before-break switch by the addition of mercury 39. So constructed, output terminal 13 remains at a positive potential (binary 1) while reed 38 is in transition between the first and second switch electrodes 35 and 36; accordingly, a continuous indication of Position No. 1 is provided until rod 52 reaches its No. 2 Position. It may further be noted that it is impossible to provide an erroneous output during the transition of reed 38 from the second electrode 36 to the first electrode 35 regardless of the construction of switch 10 since base reference potential or ground is maintained at terminal 13 during this interval by resistor 60. This is of some practical importance for transducers constructed according to the copending application of M. A. Hall entitled "High Resolution Digital Position Transducer," supra, since, as described therein, a weak magnetic field source 33 may result in a break-before-make operation of a mercury reed switch when a magnetic tooth is translated from the second magnetic electrode to the first magnetic electrode.

Continued movement of the movable member next causes it to assume Position No. 3 so as to change only the state of bistable switch 10. Further movement of Position No. 4 changes the bistable switch to its binary 0 state thereby resulting in triggering the first flip-flop stage also to its binary 0 state. This change of state of the first flip-flop stage causes a positive potential step to be applied to the set input 17 of the second flip-flop stage 19 and one of the inputs of AND gate 72. As a result, the second flip-flop stage is changed to its binary 1 state; the third flip-flop circuit, however, remains unchanged since the AND gate is then closed because of the previous 0 state of flip-flop stage 19.

Movement of the movable member to Positions Nos. 5, 6 and 7 causes bistable switch 10 and first flip-flop stage 15 to change in the manner tabulated above. Movement of rod 52 to Position No. 8 causes magnetic tooth 57 to become located between the second magnetic electrode 36 and pole 41 of the magnetic field source 33. The resulting positive potential step applied to trigger input 14 causes the first flip-flop stage to trigger to its binary 0 state. The right-hand output 16 of this flip-flop undergoes a positive change in potential which is applied to the set input 17 of the second flip-flop stage 19 and the input of AND gate 72. Since the second flip-flop is already in its binary 1 state, the positive potential step applied to its set input does not change the state of this flip-flop stage. However, this positive potential step is gated through AND gate 72 and causes the third flip-flop stage 20 to change to its binary 1 state. At this moment in the circuit operation, only the second and third flip-flop stages 19 and 20 are in their binary 1 state whereas it may be noted by reference to the table above that all three of the flip-flop stages must be in their binary 1 state in order to correctly indicate Position No. 8 of the movable member relative to the fixed member. Accordingly, the feedback path 21 is provided between the left-hand output 30 of the third flip-flop stage 20 and the set input 31 of the first flip-flop stage 15. When the third flip-flop circuit changes to its binary 1 state, a positive potential step is applied on this feedback path and changes the state of the first flip-flop stage so as to place each of the flip-flop stages in their respective binary 1 states.

Further translation of the movable member relative to the fixed member to Position No. 9 causes the bistable switch to register a binary 1 state, the flip-flop stages remaining in their binary 1 stages. Upon the termination of a positional translation detection or measurement, the rod 52 is withdrawn to its initial position (Position No. 0) and a reset pulse of appropriate polarity is applied to the reset terminal 79 for resetting each of the flip-flop stages 15, 19 and 20 to their binary 0 states. The system is then ready for subsequent positional measurements.

Accordingly, each and every one of the unique positions of the movable member relative to the fixed member are indicated by respective unique digitally encoded signals generated by the bistable switch 10 and the first, second and third flip-flop stages 15, 19 and 20, notwithstanding the fact that neither the bistable switch 10 nor the three cascaded flip-flop stages individually possess an adequate number of unique digital output signals for indicating the ten unique positions of the movable member 11 relative to the fixed member 12. This economical utilization of components is provided by deriving digitally encoded output signals from both the bistable switch and the flip-flop stages. It will be apparent to those skilled in the art that additional unique positions of the movable member may be described by adding appropriate flip-flop stages to the combination shown in FIG. 1.

The circuitry heretofore shown and described generates unique output signals encoded in the binary decimal 2–4–2–1 code. A number of different codes are utilized in present apparatus employing digitally encoded information so that it is often desirable to quickly and easily obtain outputs in an additional code so that the device will be compatible with a maximum number of digital apparatus. Accordingly, additional digital indicating systems are illustrated in FIGS. 2, 3 and 4 which are capable of providing outputs encoded in either the binary decimal 2–4–2–1 code or the binary deciman 4–2–2–1 code. For convenience, those components which may be identical are given the same nomenclature numerals as in FIG. 1.

The states of the bistable switch and the flip-flop stages required for encoding outputs in the binary decimal 4–2–2–1 code are tabulated below:

TABLE 2

| Position No. | Bistable Switch 10 ONE Output | Flip-flop 15 TWO Output | Flip-flop 19 TWO* Output | Flip-flop 20 FOUR Output |
| --- | --- | --- | --- | --- |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 1 | 1 | 0 |
| 5 | 1 | 1 | 1 | 0 |
| 6 | 0 | 0 | 1 | 1 |
| 7 | 1 | 0 | 1 | 1 |
| 8 | 0 | 1 | 1 | 1 |
| 9 | 1 | 1 | 1 | 1 |

The embodiment illustrated in FIG. 2 requires the fewest number of circuit components and illustrates the basic principal of operation of all three embodiments. As shown, the single-pole, double-throw switch 76 interconnects the set input 31 of the first flip-flop stage 15 to the left-hand output of either the second or third flip-flop stages depending upon the position of movable switch contact 77. When output 30 of the third flip-flop stage 20 is connected to the set input 31 of the first flip-flop stage 15, the circuit is identical with that shown in FIG. 1 and previously described and provides output signals encoded in the binary decimal 2–4–2–1 code. Actuation of this switch so as to interconnect output 74 of the second flip-flop stage 19 to set input 31 of the first flip-flop stage 15 enables the circuit to provide outputs encoded in the binary decimal 4–2–2–1 code in the following manner: The operation of a circuit of FIG. 2 so connected is identical to the circuit of FIG. 1 for Positions Nos. 0, 1, 2 and 3. Upon movement of the movable member to Position No. 4, the bistable switch 10 and first flip-flop stage 15 are changed to their binary 0 states while the second flip-flop stage is changed to its binary 1 state. As may be noted from the table above, it is necessary that both the first and second flip-flops be in their binary 1 state for this position. This operation is provided by feedback path 78 interconnecting the second and first flip-flop stages so that the first flip-flop stage is caused to change to its binary 1 state at this time. Continued translation of the movable member causes the circuit to operate in a straightforward manner so as to provide output signals digitally encoded in the binary 4–2–2–1 table as tabulated above.

An alternative embodiment for controlling the output code is illustrated in FIG. 3 wherein the feedback path interconnecting output 30 of the third flip-flop stage and set input 31 of the first flip-flop stage 15 includes a series diode 80 and capacitor 81 and the feedback path interconnecting output 74 of the second flip-flop stage and the set input of the first flip-flop stage includes series capacitor 82 and diode 83. The cathode of diode 80 is connected to a source 84 of positive potential via series connected resistors 85 and 86 and the anode of diode 83 is connected also to source 84 via series resistors 87 and 86. A source of negative potential 90 may be connected to the common interconnection of resistors 86 and 85, 87 by actuating switch 88. The operation of the circuit of FIG. 3 is as follows: When switch 88 is open, positive potential source 84 reverse biases diode 80 and prevents transmission therethrough of positive trigger pulses. Accordingly, the feedback path between the third and first flip-flop stages is then open. Diode 83 in the feedback path interconnecting the second and first flip-flop circuits may, however, conduct positive pulses so that the feedback path between the second and first flip-flop circuits is then closed. The circuit is then connected for generating output signals according to the binary decimal 4–2–2–1 code. Upon actuation of switch 88, the operating states of the respective diodes 80 and 83 are reversed since the diode 83 is now reverse biased by the negative potential supplied by negative potential source 90. This negative potential, however, forwardly biases diode 80 so that now the feedback path between the third and first flip-flop is closed while the path between the second and first flip-flop circuits is opened. As a result, the circuit is connected for providing output signals encoded in the binary decimal 2–4–2–1 code.

Still another embodiment for changing the coding of the output signals is illustrated in FIG. 4. This circuit includes a code control terminal 100 connected directly to an input of an AND gate 101 and to a series connected inverting amplifier 102 to an input of an AND gate 103. The function of amplifier 102 is to invert the polarity of signals applied to its input; thus, a positive signal applied to its input results in a negative signal being applied to the input of AND gate 103 whereas a negative signal applied to its input results in a positive signal being applied to the input of AND gate 103. Also connected to another input terminal of AND gate 101 is output 30 of the third flip-flop stage 20. In similar manner, the output 74 of the second flip-flop stage 19 is connected to another input terminal of AND gate 103. The AND gates are so constructed that they will pass only positive potential steps if, and only if a positive potential is applied to the other input thereof. Thus, when a positive control signal is applied to the code control terminal 100, AND gate 101 will transmit a positive potential step generated at the output of the third flip-flop stage 20; this positive control signal will prevent AND gate 103 from transmitting a pulse since it is inverted and applied to this AND gate as a negative signal. Alternatively, a negative signal applied to the code control terminal 100 will cause AND gate 103 to transmit a positive potential step generated at output 74 of the second flip-flop stage 19 to the set input 31 of the first flip-flop stage 15; this negative control signal will prevent AND gate 101 from transmitting a pulse since it is applied directly to the input thereof. The outputs of both of the AND gates are connected together and to set input terminal 31 of the first flip-flop stage 15. Accordingly, a positive signal applied to the code control terminal 100 causes the digital position indicating system to generate signals encoded in the binary decimal 2–4–2–1 system whereas a negative signal applied to the code control terminal results in the output signals being generated in the binary decimal 4–2–2–1 code.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim:

1. A system for digitally indicating a plurality of unique positions of a movable member relative to a fixed member comprising bistable switch means including a sealed capsule having first and second magnetic electrodes sealed in one end thereof, a third electrode sealed in the other end thereof, and a magnetic reed attached to said third electrode between said first and second electrodes has attracted to whichever of said magnetic electrodes has applied thereto the stronger magnetic field; means affixed to said movable member for sequentially applying the stronger magnetic field to said first and second magnetic electrodes in response to movement of said movable member relative to said affixed member; a voltage source connected between said third electrode and ground; a first resistor connected between said first magnetic electrode and ground; a second resistor connected between said second magnetic electrode and ground; first, second and third flip-flop stages each having a set input, a reset input and an output, said first flip-flop stage having an additional output and a trigger input; means connecting said second magnetic electrode to the trigger input of said first flip-flop stage; an AND gate; means connecting said additional output of said first flip-flop stage to an input of said AND gate and to the set input of said second flip-flop stage; means connecting the output of said second flip-flop stage to another input of said AND gate; means connecting the output of said AND gate to the set input of said third flip-flop stage, means for selectively connecting either the output of said third flip-flop stage or the output of said second flip-flop stage to the set input of said first flip-flop stage, means connecting a reset input terminal to the reset inputs of said first, second and third flip-flop stages; and means connecting respective digital output terminals to the first magnetic electrode of said bistable switch means and outputs of said first, second and third flip-flop stages.

2. A system for digitally indicating a plurality of unique positions of a movable member relative to a fixed member comprising bistable switch means responsive to movement of said movable member relative to said fixed member; first, second and third flip-flop stages; means connecting said bistable switch means and said flip-flop stages in a cascaded series; and means comprising a single-pole, double-throw switch having its movable member connected to the input of said first flip-flop stage and its fixed contacts connected to respective outputs of said second and third flip-flop stages for selectively interconnecting either the output of said third stage to an input of said first flip-flop stage or the output of said second flip-flop stage to said input of said first flip-flop stage so that the output of said system is encoded in a predetermined one of two possible digital codes.

3. A system for digitally indicating a plurality of unique positions of a movable member relative to a fixed member comprising bistable switch means responsive to movement of said movable member relative to said fixed member; first, second and third flip-flop stages; means connecting said bistable switch means and said flip-flop stages in a cascaded series; and means for selectively interconnecting either the output of the third stage or the output of the second stage to an input of said first flip-flop stage including a first diode connected between the output of said third flip-flop stage and an input of said first flip-flop stage, and a second diode connected between the output of said second flip-flop stage and an input of said first flip-flop stage, and means coupled to said diodes for selectively reverse-biasing either said first diode or said second diode so that the output of said system is encoded in a predetermined one of two possible digital codes.

4. The system for digitally indicating a plurality of unique positions of a movable member relative to a fixed member described in claim 3, wherein said means coupled to said diodes for selectively reverse-biasing either said first diode or said second diode comprises a source of positive potential, means connecting said source of positive potential to the cathode of said first diode and to the anode of said second diode, a source of negative potential, and means for selectively connecting said source of negative potential to the cathode of said first diode and to the anode of said second diode.

5. A system for digitally indicating a plurality of unique positions of a movable member relative to a fixed member comprising bistable switch means responsive to movement of said movable member relative to said fixed member; first, second and third flip-flop stages; means connecting said bistable switch means and said flip-flop stages in a cascaded series; and means selectively interconnecting either the output of said third stage or the output of said second stage to an input of said first flip-flop stage so that the output of said system is encoded in a predetermined one of two possible digital codes, said last means for selectively interconnecting comprising a first AND gate, means for connecting one input of said AND gate to the output of said third flip-flop stage and the other of its inputs to a code control input terminal, a second AND gate, means for inverting the polarity of a signal input, means connecting said code control terminal to an input of said second AND gate via said polarity inverting means, means connecting the output of said second flip-flop stage to the other input of said second AND gate, and means connecting the output of said first and second AND gates to an input of said first flip-flop stage.

6. A system for digitally indicating a plurality of unique positions of a movable member relative to a fixed member comprising bistable switch means responsive to movement of said movable member relative to said fixed member; said switch having a first stable state wherein a first switch terminal is connected to a third switch terminal and a second stable state wherein a second switch terminal is connected to said third switch terminal, means for connecting said third switch terminal to a source of voltage; a first digital output terminal connected to said first switch terminal; a plurality of bistable stages including a first bistable stage having an input connected to said second switch terminal; means for interconnecting said bistable stages so that each of the bistable stages other than said first stage are selectively actuated in response to changes in state of preceding bistable stages; a digital output terminal respectively connected to each of said bistable stages; and means included with said bistable switch for maintaining electrical contact between said first and third switch terminals during the period that said switch is actuated from said first to said second stable state so that said first digital output terminal is connected to said source of voltage during said actuation period.

7. The system for digitally indicating a plurality of unique positions of a movable member relative to a fixed member described in claim 6 wherein said bistable switch means comprises a make-before-break switch including a sealed capsule having first and second magnetic electrodes sealed in one end thereof and respectively connected to said first and second switch terminals, a third electrode sealed in the other end thereof and connected to said third switch terminal, a magnetic reed attached to said third electrode between said first and second electrodes, and a small quantity of mercury contained within said capsule.

8. A system for digitally indicating a plurality of unique positions of a movable member relative to a fixed member comprising bistable switch means responsive to movement of said movable member relative to said fixed member; said switch having a first stable state wherein a first switch terminal is connected to a third switch terminal and a second stable state wherein a second switch terminal is connected to said third switch terminal, means for connecting said third switch terminal to a source of voltage; a first digital output terminal connected to said first switch terminal; a plurality of bistable stages including a first bistable stage having an input connected to said second switch terminal; means for interconnecting said bistable stages so that each of the bistable stages other than said first stage are selectively actuating in response to changes in state of preceding bistable stages; a digital output terminal respectively connected to each of said bistable stages; and means connected to said first switch terminal for applying a base reference potential thereto when said terminal is disconnected from said source of voltage so that said base potential is maintained on said first digital output terminal when said first switch terminal is disconnected from said third switch terminal.

9. The system for digitally indicating a plurality of unique positions of a movable member relative to a fixed member described in claim 8, wherein said means connected to said first switch terminal for applying a base reference potential thereto when said terminal is disconnected from said source of voltage comprises a resistor connected between said first switch terminal and ground.

References Cited by the Examiner

UNITED STATES PATENTS

| | | | |
|---|---|---|---|
| 2,730,698 | 1/1956 | Daniels | 340—347 |
| 2,771,551 | 11/1956 | Hampton | 235—92 |
| 2,922,994 | 1/1960 | Kennedy | 340—347 |
| 3,099,831 | 7/1963 | Jones | 340—347 |

MALCOLM A. MORRISON, *Primary Examiner.*